United States Patent [19]

Richmond

[11] Patent Number: 5,424,749

[45] Date of Patent: Jun. 13, 1995

[54] VIBRATING OBJECT ASSESSMENT FROM A PULSE OPERATED VIBRATING SENSOR

[75] Inventor: Richard D. Richmond, Springfield, Ohio

[73] Assignee: The United States of America as represented by the Secretary of the Air Force, Washington, D.C.

[21] Appl. No.: 215,746

[22] Filed: Mar. 21, 1994

[51] Int. Cl.⁶ .................. G01S 7/292; G01S 13/89
[52] U.S. Cl. .................. 342/192; 342/196; 342/54; 342/90; 342/194
[58] Field of Search ............ 342/90, 192, 193, 194, 342/196, 53, 54

[56] References Cited

U.S. PATENT DOCUMENTS

| | | | |
|---|---|---|---|
| 4,217,583 | 8/1980 | Hiller et al. | 343/7.7 |
| 4,717,916 | 1/1988 | Adams et al. | 342/107 |
| 4,771,287 | 9/1988 | Mims | 342/25 |
| 4,992,797 | 2/1991 | Gjessing et al. | 342/192 |
| 5,113,193 | 5/1992 | Powell et al. | 342/25 |
| 5,119,100 | 6/1992 | Marini et al. | 342/195 |
| 5,122,803 | 6/1992 | Stann et al. | 342/25 |
| 5,192,979 | 3/1993 | Grage et al. | 342/192 X |
| 5,227,801 | 7/1993 | Pierce | 342/192 |

Primary Examiner—John B. Sotomayor
Attorney, Agent, or Firm—Gerald B. Hollins; Thomas L. Kundert

[57] ABSTRACT

A distant target vibration assessment and signature determining apparatus for operation from a vibrating platform such as an aircraft or helicopter. The disclosed system employs pulse illumination of the distant target and of nearby atmospheric aerosol particles and uses the latter illumination derived signal as a characterization in reverse of the vibrations of the sensor's mounting platform. The nearby and distal nature of the two illuminated energy reflections enables their range gated segregation and individual transformation into the frequency domain. Frequency domain vibration signatures of the distant target and the vibrating platform are then individually obtained and subtracted in order to obtain a clean vibration spectrum representation of the distant target. Variations of the system including a two pulse operating cycle, the use of signal strength evaluation and signal processing alternatives are also disclosed.

20 Claims, 5 Drawing Sheets

VIBRATING OBJECT ASSESSMENT FROM A PULSE OPERATED VIBRATING SENSOR

RIGHTS OF THE GOVERNMENT

The invention described herein may be manufactured and used by or for the Government of the United States for all governmental purposes without the payment of any royalty.

BACKGROUND OF THE INVENTION

This invention relates to the field of radiant energy systems for detecting and assessing distant objects.

Previous uses of laser radar to sense target vibrations have employed continuous wave (CW) lasers. Such CW lasers, however, provide no range resolved information so that it is difficult if not impossible in such systems to separate frequency information arising from vibrations of the sensor platform from those of interest of the target.

Previous attempts to segregate target and sensor platform vibrations have therefore employed gyroscopic or inertial reference based sensors to attempt a determination of the motion of the platform. However, such sensors are cumbersome and difficult to use, and are limited in frequency and spatial response. Moreover, and also platform motions too small to be sensed by these sensors may in fact contribute significantly to the spectrum noise of the sensed target.

The recent emergence of practical optical radars or laser radars (i.e. ladar) systems which operate in the near-infrared region of wavelength, such as the two micrometer laser based systems, has however made a different and more practical approach to the moving platform based assessment of a vibrating target possible. Such a system is the subject of the present patent document.

SUMMARY OF THE INVENTION

In the present invention a vibrating target is assessed from a vibrating platform mounted ladar or radar system by way of deriving a signal representative of the vibrating platform motion from the ladar's backscatter signal return. A backscatter signal return occurs when the distant target illuminating ladar energy also encounters moisture and dust and other atmospheric aerosol particles which reside along the path between the ladar system and the distant target. The invention moreover provides for the target illumination return and the backscatter reflected signal return of interest to each originate with a single pulse of illumination energy from the ladar system. Alternately a double pulse operating cycle may be used for this system in order that one pulse illuminate the near at hand aerosol particles and the other pulse illuminates the distal target.

It is an object of the present invention, therefore, to provide distant object vibration signature data while using a vibrating platform carried apparatus.

It is another object of the invention is to provide a pulsed illumination system for vibrating target assessment.

It is another object of the invention to provide a radiant energy illuminating system for vibrating distant object assessment that is also capable of providing distant object range measurement information.

It is another object of the invention to provide this distant target vibration assessment and a backscatter signal source from the same pulse of illuminating energy.

It is another object of the invention to provide distant target vibration assessment apparatus that can be embodied to employ either a laser illumination system or a radio frequency energy illumination system for the distant object.

It is another object of the invention to provide a vibrating platform vibrating target assessment from a short wavelength optical source such as a two micrometer wavelength infrared laser.

It is another object of the invention to provide a vibrating target assessment apparatus having coherent signal detection.

It is another object of the invention to provide a vibrating target identification system which is based on the Fourier transform or other transform signature of the target vibration.

It is another object of the invention to provide for the identification of a distant target from its transform signature and the comparison of this signature with a library of known target signatures.

Additional objects and features of the invention will be understood from the following description and claims and the accompanying drawings.

These and other objects of the invention can be achieved by:

vibrating platform based distant military target vibration assessment apparatus comprising the combination of:

military vehicle vibrating platform mounted pulsed line of sight coherent radiant energy source means of predetermined optical wavelength for illuminating both said vibrating distant target and aerosol particles, including dust or moisture particles, suspended in atmospheric space intermediate said source means and said distant military target;

radiant energy reception means, selective of said predetermined optical wavelength of said radiant energy source means and Doppler variations thereof, for receiving pulsed reflected energy signals from said distant military target and backscatter reflection signals from said suspended aerosol particles;

means for segregating said reflected energy signals into time distinguished nearby suspended aerosol particle reflected and distant military target reflected first and second received signals each of which also include, said vibrating platform generated, signal components;

fast Fourier transform means for generating vibrational platform components inclusive of first and second transform spectrum representations of said nearby suspended aerosol particle and said vibrating distant object reflected first and second received signals;

signal processing means for subtracting said nearby suspended aerosol particle first transform representation of said vibrating platform vibration from said combined vibrating distant target and vibrating platform second spectral representation to obtain an output fast Fourier transform signature representation of vibrations of said distant target.

DETAILED DESCRIPTION

A radar (either microwave or laser) can be used to measure the speed, relative to the radar's platform, at which a target is moving. In coherent detection radar, this relative motion is transformed into a Doppler frequency shift, where the amount of frequency shift is directly proportional to the relative velocity, as well as to the wavelength of the laser. Although this type of sensing is most routinely used to measure the linear velocity or speed of an entire target, (e.g. the police radars of both the microwave and laser types), such systems can also be used to measure much smaller motions, including those associated with vibrations on the surface of the target.

By monitoring the Doppler frequency of these small scale changes over time, a time history of the frequencies can be obtained. This time history can be Fourier transformed into the frequency domain and the spectrum of the vibration frequencies generated. Because these spectra are target unique, they can be used as a discriminate or signature to identify the target.

The effect actually measured in such a system is, however, the relative motion between the sensor platform and the target. As a result, the measured frequencies can also include sensor motion due to platform motion and the platform motion frequencies therefore often interfere with or mask the spectrum of the target.

The present invention discloses a technique using a pulsed laser radar, i.e., a ladar, that can be used to measure and then subtract out the platform induced frequencies. The remaining spectrum is then that of the target alone; i.e. a unique frequency spectrum signature for the target. This signature, can of course be compared with previously determined library signatures to determine the identity of the target or alternately to assess the operating or quiescent status of the target or even to appraise such detailed information as the relative quality or degree of maintenance of the target.

Figure 1:
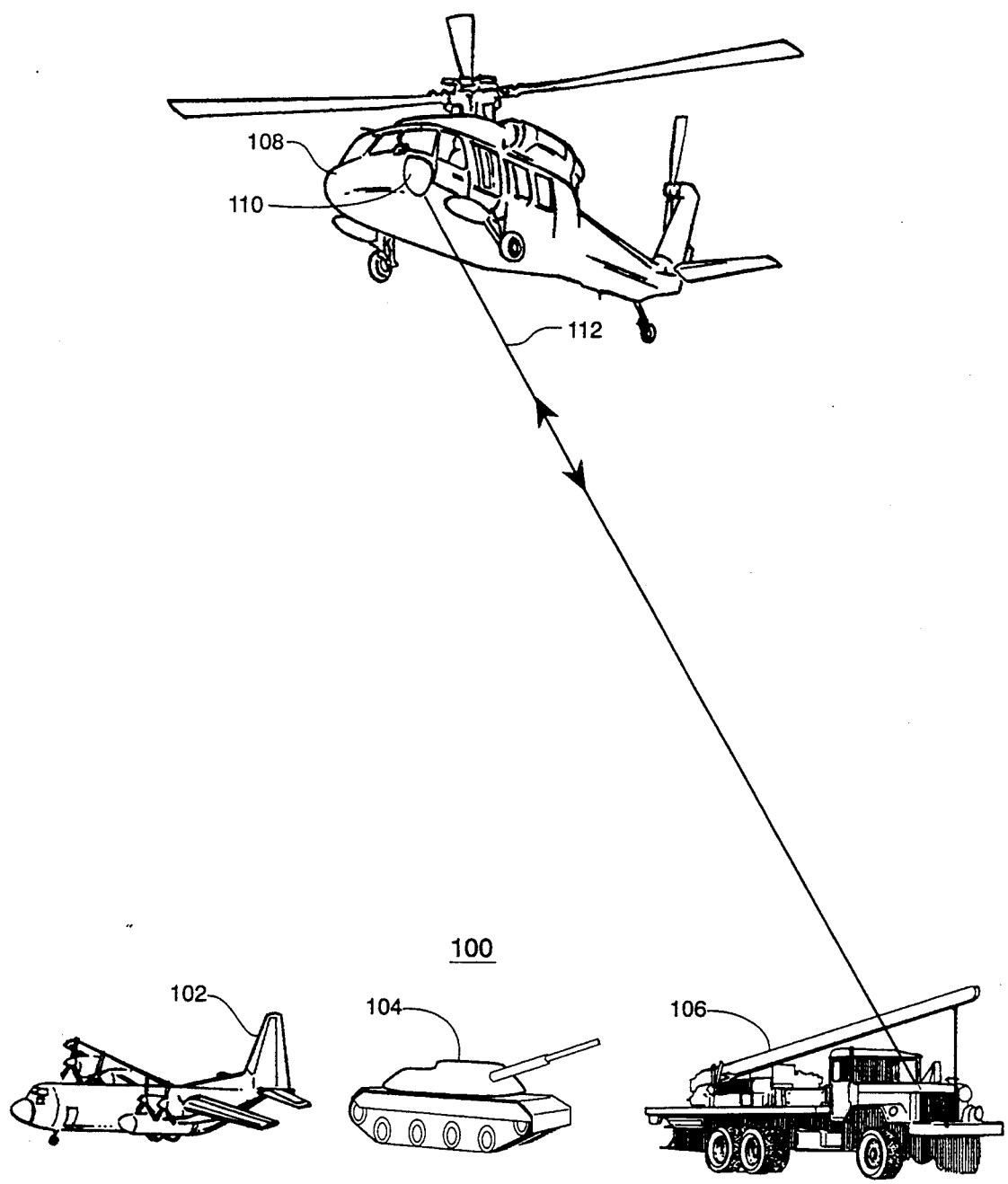
FIG. 1 shows a military embodiment of a distant object vibration signature apparatus operating from a helicopter vibrating platform.

FIG. 1 shows a target assessment arrangement of this type in which the assessment apparatus 110 is mounted on a vibrating platform such as the helicopter 108. In the FIG. 1 arrangement the vibrating platform apparatus communicates with the variety of targets illustrated at 100 along the two-way straight line path indicated at 112.

As shown in FIG. 1 the vibrating platform apparatus 110 is engaged with the hood portion of the truck vehicle 106. This engagement is by way of the path 112 along which illumination energy from a radiant energy source in the apparatus 110 is traveling to the truck 106 and energy reflections from the truck 106 are returning to the vibrating platform apparatus.

The radiant energy source employed in the vibrating platform apparatus 110 is preferably of the infrared laser type and has an output energy that is in the range of two micrometers of wavelength. Such present-day ladars are capable of generating beam diameters that are in the range of 10–20 centimeters so that indeed directing the output energy of such a laser to a portion of a truck vehicle as illustrated in FIG. 1 is feasible. Separation distances between platform and target along the path 112 using lasers of this type may easily extend into the tens of kilometers.

The FIG. 1 scenario may be appreciated to be typical of both military and civilian applications of a vibration sensing system. In this scenario it is of course easily understood that two major sources of vibration are encountered, the first being the well-known flutter and resonance and other vibrations encountered in a helicopter aircraft. The second source is the equally well-known and perhaps smaller amplitude vibrations encountered in either a moving or stationary, but engine running vehicle such as the truck 106. Clearly, for a meaningful assessment and identification of the truck 106 these two components of vibration must be segregated.

FIG. 1 also shows two typical additional targets which may be of interest to a surveillance helicopter in a military use of the invention. These additional targets are the battle tank shown at 104 and the aircraft 102. These additional targets may of course be in either the quiescent or operating condition when assessed by the sensing apparatus of the present invention. The scenario illustrated in FIG. 1 is of course not limited to military applications of the invention since for example, the assessment of a vibrating distant object can be used to great advantage in police work, in hazardous environment situations such as in the chemical and nuclear industries, and can also be used in detecting the need for maintenance of equipment in transportation, oil field, or industrial settings.

Traditionally, when laser radars are considered as sensors for measuring the vibration spectrum of a target, the laser has been of the continuous wave type. This has been done in order to provide a long measurement time that allows good low frequency measurement capability in the system. For example, in order to measure a 10 Hz signal, the measurement time should be at least 1/10 or 0.1 seconds. In practice, the Nyquist theory requires twice this amount of measurement time, or 0.2 seconds. Among the problems with this traditional approach are the following;

1) Although the laser is transmitting continuously, measurements are made only periodically and the laser is sized to provide a sufficient energy level during these periodic measurements. The average laser power requirement can therefore be quite large.

2) The continuous nature of the transmitted laser energy makes it impossible to derive range resolved information from the return signal.

3) A continuously operating emission source invites counteraction in a military environment; e.g., use of an emission seeking missile.

As an improvement alternative, a pulsed laser can be used for the vibration sensing. Rather than operating the laser continuously and making discrete measurements, the laser can be turned on or pulsed (with even a single pulse) only when a measurement is to be made. These fast, and if necessary, repetitively pulsed laser bursts and corresponding return signal Doppler measurements can then be Fourier transformed to provide the type of data obtained using the traditional continuous wave laser arrangement. Although the energy level needed for each such measurement is the same as for the CW method, the overall duty cycle is much reduced and thus the average energy required for the same level of performance is significantly reduced.

In addition to this energy saving characteristic of a pulsed laser for distant object vibration sensing, pulsed operation of the laser in such an apparatus provides opportunity between laser pulses for accomplishing range measurement to the distant object. In this arrangement the receiver portion of the ladar apparatus is enabled as soon as possible after the end of the laser pulse in order that the returning or reflected energy signals from the distant object be received.

In the present invention, it is of course desired that the returning or reflected energy signal from aerosol particles located between the ladar apparatus and the distant target also be received during the receiver enabled period. The aerosol particles of greatest interest are presumed to reside closer to the ladar apparatus than is the distant target, i.e., aerosol particle returns from the first few hundred meters of distance along the path 112 in FIG. 1 are considered to be of primary interest in the distant target vibration sensing of tile present invention. It should of course be recognized that the present invention contemplates the use of these aerosol particles return signals for a determination of the vibrating sensor platform vibration characteristics and that this arrangement inherently contemplates the aerosol particles to be in an effectively quiescent or motionless condition. Additional input signals such as wind velocity, a $V_2$ term in equation (1) below, are required for the vibration sensing system when this assumption cannot be made. A non-zero wind velocity term in the invention is, in fact, acceptable because the invention system is primarily concerned with oscillating or vibration motion.

It should also be recognized that the preferred operating wavelength range for the laser of the present system, that is, a wavelength in the range of two micrometers, is compatible with the size of moisture, dust, and other particulate matter to be encountered in the earth's atmosphere. Illumination of this wavelength is therefore capable of providing a usable particle reflected backscatter signal in the present invention.

This compatibility of the laser illumination wavelength and particle size also contributes to a tendency for the moisture and dust aerosol particles to be significantly attenuating to the energy originating in the laser. Indeed it is this attenuating consideration which suggests use of the backscatter signals originating in the first few hundred meters of distance along the path 112 in FIG. 1 for obtaining the platform vibration sensing signal. As a result of this attenuation, if the desired backscatter signal were to be derived from particle returns originating adjacent the distant target, the particle return signal magnitude would be so low as to require a receiver of unusually large dynamic range capability in order that both the relatively strong signals from the distant target 106 in FIG. 1 be accepted along with the highly attenuated aerosol particle signals.

This wavelength to particle size compatibility consideration also suggests that the radiant energy source employed in the present invention is most practically in the form of a laser device, a device emitting radiant energy of the micrometer wavelength range in preference to a radio frequency energy emission source wherein the emitted energy would do well to approach the one to two centimeters of wavelength frequency range. In order to obtain backscatter signals of significant amplitude from such one to two centimeter wavelength illumination energy, atmospheric particles which approach this wavelength in dimension would of course be most effective. Although such particles may occasionally exist, and might well be artificially provided (e.g. chaff) to enable operation of a system of the present type, the use of optical energy with its much shorter wavelength is believed a more practical approach and is now a matter of at least laboratory accomplishment in the laser art. Operation of a system according to the present invention in the radio frequency range is however contemplated as a part of the invention. A system according to certain aspects of the present invention may also be achieved by using the return signal from a known to be motionless ground object in order to generate a platform vibration representative return signal. Since the location size, shape, and other details attending such a ground object (including its motion status) are not predictable however, the herein described aerosol particle return arrangement of the invention is preferred.

Figure 2:
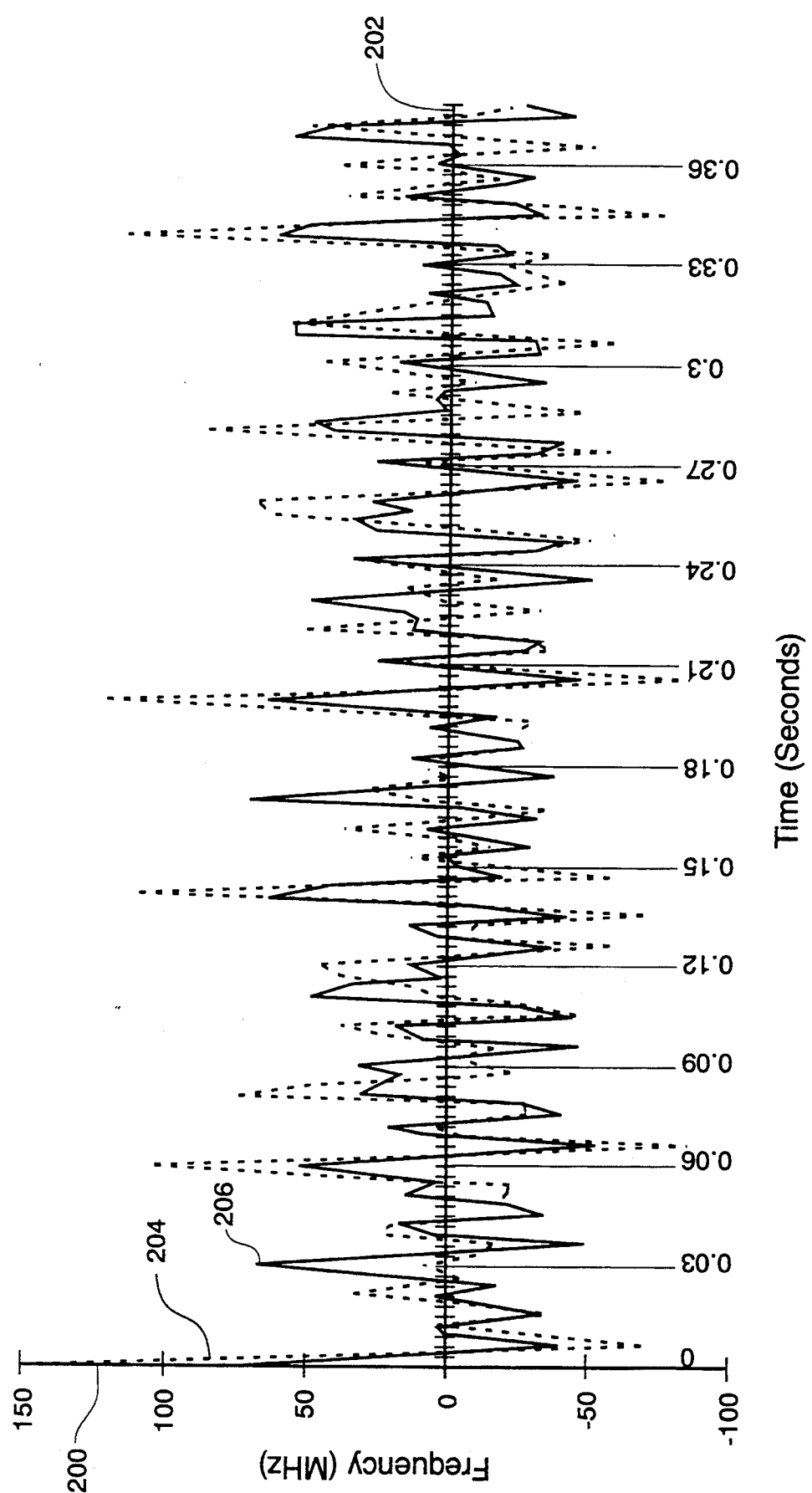
FIG. 2 shows typical Doppler frequency signal returns in an apparatus of the FIG. 1 type.
Figure 3:
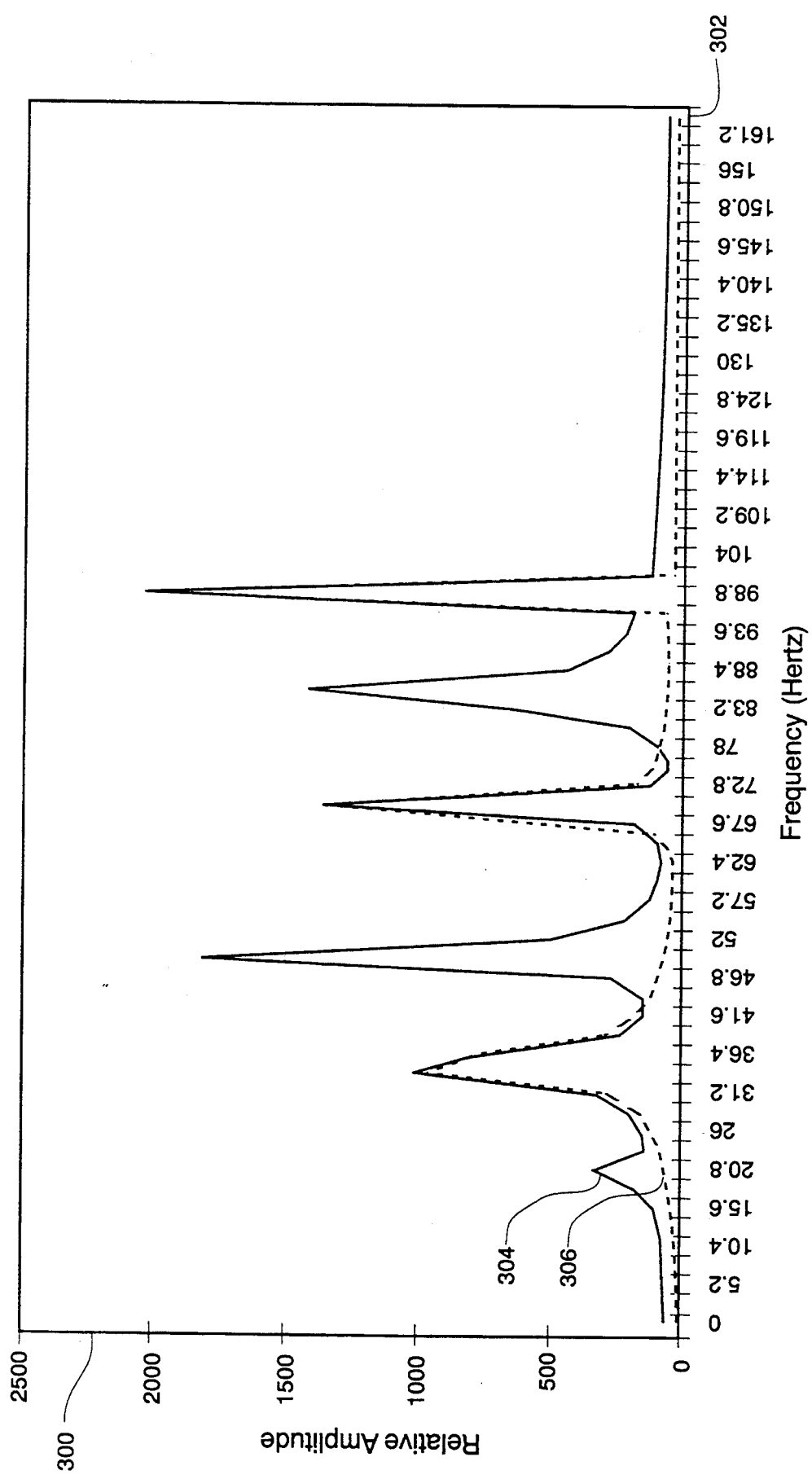
FIG. 3 shows a power spectrum representation of the FIG. 2 signals including both distant object and platform vibration components.
Figure 4:
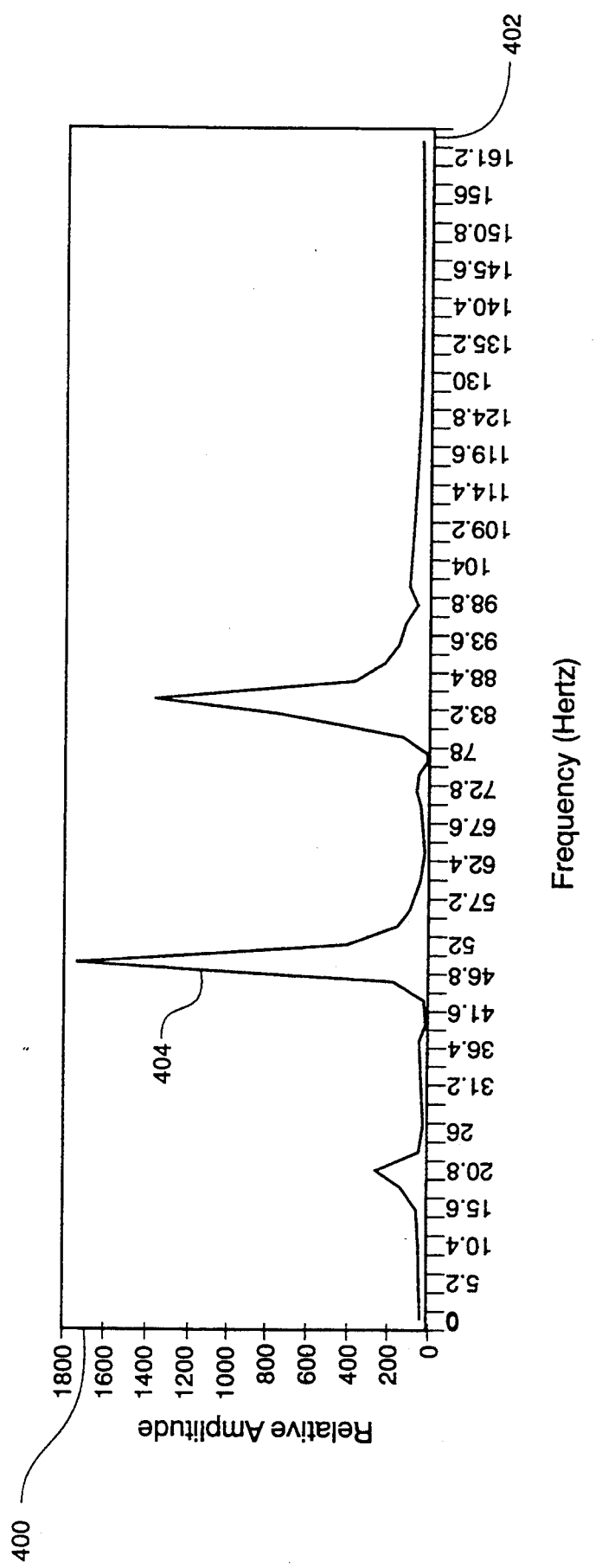
FIG. 4 shows a power spectrum representation of the sensed target vibrations absent the moving platform vibration components from FIG. 3.

In order to more fully disclose the concepts of the invention, both the following mathematical equations and the waveforms shown in FIGS. 2–4 of the drawings are believed to be of assistance. First consider mathematically the sensing operation of a monostatic laser radar (ladar) system that illuminates a vibrating and moving target and that detects and analyzes the backscatter light for obtaining information about the detector's motion. In this mathematical consideration, let V(t) be the time dependent surface velocity (m/s) of the target along the ladar to target line of sight (LOS). The velocity, V(t) can be separated into the relatively constant component due to target translation, $V_l(t)$, and into the high frequency vibration component, $V_h(t)$:

$$V(t) = V_l(t) + V_h(t) \tag{1}$$

where the subscripts l and h refer to high and low frequencies, not velocities. For the purpose of this consideration $V_l$ can be regarded to be constant and can be ignored. The velocity, $V_h(t)$, is related to the vibration of the target skin as follows:

$$V_h(t) = d/dt\, A^*\sin(\omega t) = A\omega^*\cos(\omega t) \tag{2}$$

where A is the amplitude of the vibration and $\omega$ the angular frequency of the vibration (rad/s). A ladar does not measure the relative velocity of a target directly, but measures the Doppler frequency induced on the return signal by that relative velocity. That frequency, $f_D$, is $$f_D = 2V/\lambda \tag{3}$$

with $\lambda$ being the laser wavelength. Combining equations 2 and 3 and using the common relationship, $\omega = 2\pi f_v$, with $f_v$ being the vibration frequency in Hertz, an instantaneous Doppler frequency is given by $$f_D = [4\, \pi A f_v \cos(2\, \pi f_v t)]/\lambda \tag{4}$$

It is the time history of the change in $f_D$ that contains the vibration spectrum information.

Several factors affect the accuracy or resolution of a pulsed spectrum measurement. First, the pulse width, $t_p$, limits the resolution to which the Doppler frequency can be measured, $$f_{measured} = 1/t_p \quad (5)$$

This minimum frequency limits the accuracy with which the frequency changes can be measured. Again, this technique measures the instantaneous frequency at regularly spaced intervals, $t_i$, over a period of time, $t_n = nt_i$, with n being the number of measurements made. These two quantities will limit the upper and lower vibration frequencies that can be derived from the data. The lowest frequency that can be derived, $f_{min}$, and the highest, $f_{max}$, are given by $$f_{min} = 1/t_n \quad (6)$$

$$f_{max} = 1/2t_i \quad (7)$$

When the temporal variations in measured frequency are treated in the same manner as a time varying amplitude, a Fast Fourier Transform (FFT) of the data will produce a power spectrum of the frequencies at which the target is vibrating between $f_{min}$ and $f_{max}$. Using the pulsed nature of the outgoing laser pulse, range gating can be used to first capture the return signal from the atmospheric aerosols in the immediate vicinity of the platform. Range gating at a later time captures the return signal from the distant target of interest. These measurements are herein treated as separate data sets and FFT's are performed on each to produce two spectra. The first spectra contains the vibration frequencies of the platform, the second, of both the platform and the target. The first spectra is therefore subtracted from the second and the result is the spectra of the target alone.

To further disclose the invention by way of an example, a target vibrating at the combined or plural frequencies of 20, 50, and 85 Hertz may be considered. Platform vibrations at 35, 70, and 99 Hertz are also considered to be present in this example. Shown in FIG. 2 on the coordinate axis pair 200 and 202 are the time history of the measured Doppler frequencies of the platform alone, the curve at 206, as well as those of the target and platform combined at 204. The first curve at 206 therefore represents the frequencies that are measured from the aerosol backscatter, i.e. the frequencies due to platforms vibrations. The second curve at 204 represents the measured return from the target. FIG. 3 shows, on the coordinate axis pair 300 and 302, the curves 304 and 306 of the respective power spectra derived from a Fast Fourier Transform (FFT) processing of the two data sets of the curves 204 and 206. It can be seen that all of the above frequencies are present in the target power spectrum at 304 in FIG. 3.

The FIG. 4 curve 404, on the coordinate axis pair 400 and 402, shows the results desired in the present invention. Here, the platform power spectrum has been subtracted from the target power spectrum. The resulting difference power spectrum is plotted in the FIG. 4 curve 404 where the remaining frequencies are those of the target at 20, 50, and 85 Hz. The spectrum of frequencies included in the curve 404 can therefore be said to be characteristic of, or the vibration signature of, the considered exemplary target. Clearly this signature, including both its frequency and amplitude aspects, can be appreciated to provide a highly discriminating identification of even the considered simple spectrum target. Other targets may of course have a different number of signature frequencies and also have different amplitude relationships between these frequencies and therefore in many instances provide an even more unique identification signature.

An operational system that is based on the concepts of the present invention may include a library of target signatures such as that shown in the FIG. 4 drawing and also include degree of match measurement algorithm processing for automatically performing the target identification function and optionally computing a degree of confidence factor for evaluation of an achieved match.

Figure 5:
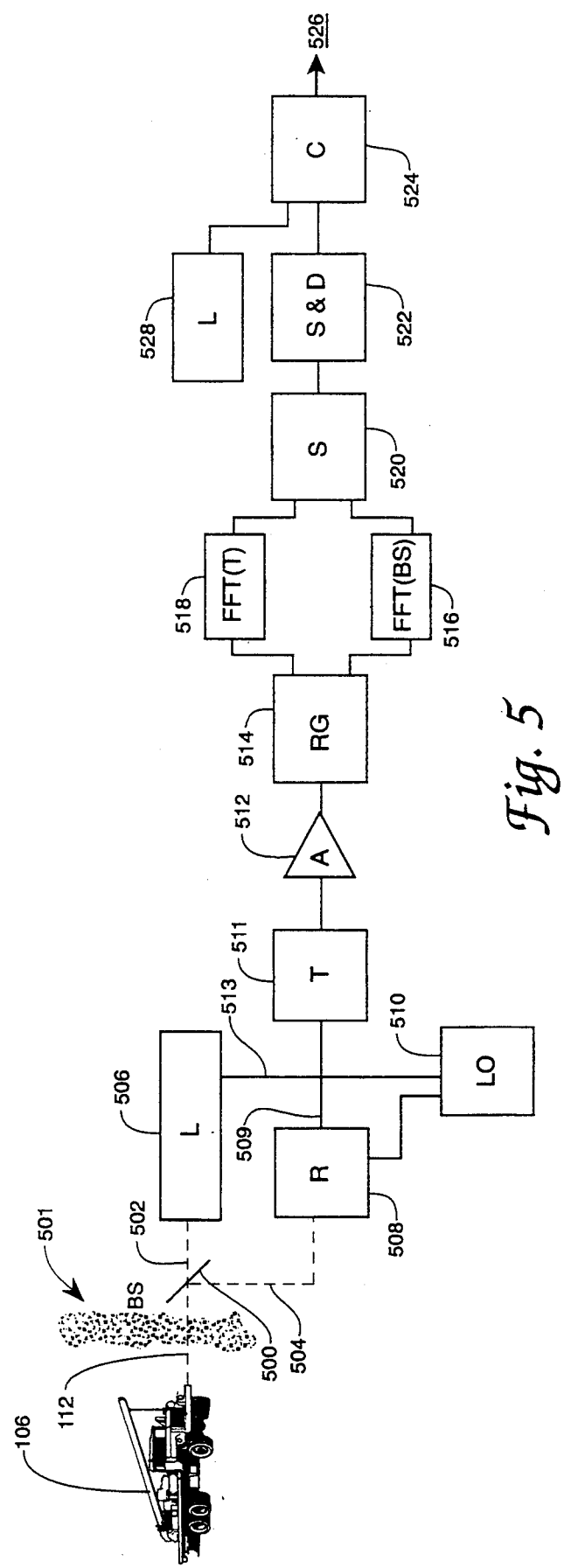
FIG. 5 shows a block diagram for implementing a preferred arrangement of the present invention.

FIG. 5 in the drawings shows a vibrating platform vibrating target assessment apparatus according to the present invention in block diagram form. In the FIG. 5 drawing, the target 106 and path 112 shown in the FIG. 1 view are repeated and in addition internal details of the vibrating platform apparatus 110 are disclosed. For drawing convenience, the truck comprising the target 106 is shown to reflect energy received along the path 112 from a frontal position rather than from its previously shown hood portion. In the FIG. 5 apparatus, the illumination energy for the target 106 is supplied by the laser 506 which is preferably of the above described infrared short wavelength type and operates in the spectral region of 2 micrometers of wavelength. Illumination energy from the laser 506, travels along the path 502 through the beam splitting element 500, the aerosol particles 501, and the path 112 to reach the target 106.

At the target 106, this laser energy incurs Doppler frequency modulation and is partially returned along the path 112. This returning energy is directed by the bean splitter 500 along the path 504 to the optical receiver and mixer apparatus 508 where coherent detection using a phase reference signal from the local oscillator 510 occurs. The local oscillator 510 also supplies a coherent detection enabling phase reference signal to the laser 506 along the path 513. The detected intermediate frequency signal along the path 509 if not already in electrical form is converted to an electrical signal by a transducer indicated at 511 and amplified in the intermediate frequency electrical amplifier indicated at 512.

Near field and far field signal returns in the signal from the amplifier 512 are segregated by the range gating apparatus indicated at 514 in FIG. 5 and the results of this segregation subjected to fast Fourier transform processing in the blocks 516 and 518. Transformation of the shorter range aerosol backscatter signals may occur in the block 516 for example and the longer range target signals are transformed in the block 518. The subtraction of the block 516 backscatter signals, that is, the subtraction of the moving platform spectrum data, from the platform and target vibration signals of the block 518 occurs in the block 520, this block performing the FIG. 3 to FIG. 4 changes described above.

Storage of the FIG. 5 target signature information and its display to an operator where desired, are represented in the block 522 and comparison of the vibration spectrum signature of the target 106 with the signature of other target occurs in the block 524, the other target signature data being preserved in the library of block 528. The signal at 526 indicates an identification match.

The FIG. 5 system may of course be altered and simplified in many instances, such alterations including for example, a time sharing of the fast Fourier transform algorithm in blocks 516 and 518. Such a simplified system may also eliminate the library of vibration spectrum signals in block 528, if not needed, and possibly employ a combination of the receiver-mixer apparatus of block 508 with the laser apparatus of block 506. An elimination of the beam splitter 500 may be employed according to another variation of the FIG. 5 system, and the fast Fourier transformation of the blocks 516 and 518 may be replaced with Fourier transformations or other mathematical transformations that are known in the art.

It is interesting to note that the optical signal along the path 509 in FIG. 5 represents the frequency and phase differences between the outgoing optical signal on the path 502 and the incoming or returning optical signal along the path 504; these frequency and phase differences of course arise from the Doppler modulation of the Laser signal by the target 106 and by the aerosol particles at 501. This difference signal, even when representative of only a few degrees of phase difference between two optical signals may nevertheless correspond to a difference frequency of hundreds of megahertz. Signals of this relatively high frequency range are to be optically and/or electrically processed in the blocks 511, 512, and 514 of FIG. 5. Generally, in view of the Doppler frequency characteristic described in equation 3 above, wherein the Doppler frequency is dependent on both the vibration frequency of the target and the operating wavelength of the laser, it is found that at a two micrometer wavelength a 2 meter per second velocity provides a 2 megahertz difference frequency.

In a system arranged according to FIG. 5 it is also convenient to employ an offset convention in order to allow one to determine target movement direction. For example, such a convention may be based on the difference frequency of 25 megahertz with frequencies below 25 megahertz representing a target moving toward the transmitter and frequencies above 25 megahertz representing a target moving away. These frequencies are used to offset the overall velocity of the target ($V_L$ in equation (1)) and keep the resulting signal within the bandwidth of the electronics.

The FIG. 5 system is based on the preferred concept that the same pulse of laser illumination energy provides both the nearby backscatter reflection signals and the reflection signal from the distant target 106. In some instances especially where processing speed limitations are encountered, it may be desirable to arrange a system of the FIG. 5 type such that the returning signals from one laser pulse are used for the distant target 106 and the returning signals from a second pulse are used for the nearby aerosol particles, represented at 501 in the FIG. 5 drawing. A "two pulse" system of this type can provide additional return signal processing time and possibly some signal processing simplification but incurs the expense of additional energy requirements.

According to another variation of the FIG. 5 system, provision may be made for measuring the strength of the signal returning from the aerosol particles 501 in order to estimate the atmospheric attenuation incurred by the laser beam and enable consideration of the target return signal strength as another facet of the target's signature. Such data also allow estimation of the target physical size and reflectivity characteristics to be made.

The present invention therefore provides a number of advantages in a distal target vibration assessment system. These advantages include the following.

a. Provision of a nonintergized or quiescent time between laser pulses in which returning signal energy may be examined for target distance and signal return characteristics.

b. A reduction in the average power needed for system operation and in the power dissipation capability required of the laser apparatus.

c. A segregation of nearby aerosol particle signals from the more distal target signals and the separate utilization of each of these signals. This separate utilization in the present instance includes assessment of sensor platform vibration.

d. A reduction of system noise signals through more actuate characterizing of platform vibrations.

e. Use of the same illumination pulse for the distal target and the nearby aerosols to further conserve illumination energy and permit timing and apparatus simplifications.

f. Enabled assembly of a time history of changes in velocity that are directly related to vibrations of a target in order to build a data base, especially in the instance of sparsely sampled targets.

g. Eliminated need of gyroscope or other reference signal sources to assess platform vibrations.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. The method of sensing distal target vibration components in pulsed reflected energy returning to a vibrating platform mounted transmitting and receiving apparatus comprising the steps of:

illuminating said distal target with periodic pulses of carrier frequency radiant energy originating in said vibrating platform mounted transmitting and receiving apparatus;

said periodic pulses of energy communicating between said vibration platform mounted transmitting and receiving apparatus and said distal target via an atmospheric path inclusive of dust, moisture, or other natural occurrence and human originated aerosol particulates;

segregating received reflected energy pulses, according to returning arrival time, into a close range aerosol particle reflected and a far range distal target reflected range gated pair of reflection signal groups;

generating a first Fourier transformation spectral representation of said distal target reflected signal group signals, said first Fourier transformation representation including spectral components generated by both said distal target vibration frequencies and by said vibrating platform vibration frequencies;

generating a second Fourier transformation spectral representation of said close range aerosol particle reflected signal group signals, said second Fourier transformation representation also including spectral components generated by said vibrating platform vibration frequencies;

subtracting said second Fourier transformation spectral representation from said first Fourier transformation spectral representation to obtain a third, difference Fourier transformation spectral representation, characteristic of said distal target vibrations.

2. The method of claim 1 wherein said illuminating step periodic pulses are comprised of phase controlled coherent energy and wherein said reflected energy pulses include carrier frequency components that are Doppler frequency shifted from a carrier frequency of said illuminating step energy pulses.

3. The method of claim 1 further including the steps of:

generating with an external sensor a reference signal representative of motion in said aerosol particles; and subtracting from said second Fourier transformation representation a Fourier transformation spectral representation of said aerosol particle motion.

4. The method of claim 1 wherein said illuminating step transmitting and receiving apparatus is a microwave radio frequency apparatus.

5. The method of claim 1 wherein said illuminating step transmitting and receiving apparatus is an optical laser ladar apparatus.

6. Distal object vibration sensing apparatus comprising the combination of:

vibrating platform mounted pulsed radiant energy source means for illuminating both said vibrating distal object, and atmospheric aerosol particles residing between said source means and said distal object, with pulses of radiant energy;

radiant energy receiver means for receiving pulsed reflected energy signal components of said distal object and said aerosol particle illuminating energy;

range gating means for segregating said reflected energy signal components into nearby aerosol particle reflected and vibrating distal object reflected first and second signals;

said vibrating distal object reflected signals also including vibration signal components attributable to vibrations of said vibrating platform;

means for generating transform spectral representations of said nearly aerosol particle and said vibrating distal object reflected first and second signals;

signal processing means for subtracting said nearby aerosol particle spectral representation, and thereby a representation of said vibrating platform transform spectrum representation; from said vibrating distal object reflected transform spectral representation to obtain an output transform signal representative of vibrations of said distal object.

7. The apparatus of claim 6 wherein said vibrating platform comprises an aircraft.

8. The apparatus of claim 6 further including:

means for accumulating a multiple measurement predetermined time history of small scale changes in vibrations of said vibrating object;

means for Fourier transforming said time history into the frequency domain; and means responsive to the spectrum signature of said vibration time history for identifying said, object.

9. The apparatus of claim 6 wherein said pulsed radiant energy source means comprises an optical radar laser apparatus.

10. The apparatus of claim 9 wherein said pulsed radiant energy source means includes an infrared laser.

11. The apparatus of claim 6 wherein:

said pulsed radiant energy is coherent energy; and said reflected energy signal components are Doppler frequency shifted from said radiant energy source means illuminating signal.

12. The apparatus of claim 11 wherein said signal processing means further includes means for determining a linear movement velocity of said vibrating distal object.

13. The apparatus of claim 6 further including energy conserving means for enabling and disabling said pulsed radiant energy source means.

14. The apparatus of claim 6 wherein said atmospheric aerosol particles comprise at least one of atmospheric dust particles and atmospheric moisture particles.

15. The apparatus of claim 6 wherein said means for generating transform spectral representation comprises a fast Fourier Transform algorithm.

16. The apparatus of claim 6 further including atmospheric attenuation determination means for measuring the strength of said aerosol particle reflected first signal.

17. Vibrating platform based distant military target vibration assessment apparatus comprising the combination of:

military vehicle vibrating platform mounted pulsed line of sight coherent radiant energy source means of predetermined optical wavelength for illuminating both said vibrating distant target and encountered aerosol particles, including dust or moisture particles, suspended in atmospheric space intermediate said source means and said distant military target;

radiant energy reception means, selective of said predetermined optical wavelength of said radiant energy source means and Doppler variations thereof, for receiving pulsed reflected energy signals from said distant military target and backscatter reflection signals from said suspended aerosol particles;

means for segregating said reflected energy signals into time distinguished nearby suspended aerosol particle reflected and distant military target reflected first and second received signals each of which also include said vibrating platform generated signal components;

fast Fourier transform means for generating vibrational platform components inclusive first and second transform spectrum representations of said nearby suspended aerosol particle and said vibrating distant object reflected first and second received signals;

signal processing means for subtracting said nearby suspended aerosol particle first transform representation of said vibrating platform vibration from said second combined vibrating distant target and vibrating platform spectral representation to obtain an output fast Fourier Transform signature representation of vibrations of said distant target.

18. The apparatus of claim 17 wherein said predetermined optical wavelength coherent radiant energy source means includes an infrared spectrum laser of two microns operating wavelength.

19. The apparatus of claim 17 wherein said radiant energy source means includes a first pulse and second pulse operating cycle and wherein said nearby suspended aerosol particle reflected first received signal originates in illumination from one of said first pulse and said second pulse and said distant military target reflected second received signal originates in illumination from the other of said first pulse and said second pulse.

20. The apparatus of claim 17 wherein said radiant energy source means includes a single pulse operating cycle and wherein said nearby suspended aerosol particle reflected first received signal and said distant military target reflected second received signal each comprise time segregated reflections of said single pulse.

* * * * *